United States Patent
Tang et al.

(10) Patent No.: US 11,887,271 B2
(45) Date of Patent: Jan. 30, 2024

(54) METHOD AND SYSTEM FOR GLOBAL REGISTRATION BETWEEN 3D SCANS

(71) Applicant: Hong Kong Applied Science and Technology Research Institute Company Limited, Hong Kong (CN)

(72) Inventors: Xueyan Tang, Hong Kong (CN); Suk Ling Li, Hong Kong (CN)

(73) Assignee: HONG KONG APPLIED SCIENCE AND TECHNOLOGY RESEARCH INSTITUTE COMPANY LIMITED, Hong Kong (CN)

( * ) Notice: Subject to any disclaimer, the term of this patent is extended or adjusted under 35 U.S.C. 154(b) by 357 days.

(21) Appl. No.: 17/445,402

(22) Filed: Aug. 18, 2021

(65) Prior Publication Data

US 2023/0064011 A1 Mar. 2, 2023

(51) Int. Cl.
G06T 19/20 (2011.01)
G06T 3/00 (2006.01)
G06T 7/33 (2017.01)

(52) U.S. Cl.
CPC ............ *G06T 3/0068* (2013.01); *G06T 7/337* (2017.01); *G06T 19/20* (2013.01); *G06T 2207/10028* (2013.01); *G06T 2219/2004* (2013.01)

(58) Field of Classification Search
CPC ....... G06T 3/0068; G06T 7/337; G06T 19/20; G06T 2207/10028; G06T 2219/2004; G06T 2207/30252; G06T 7/33
(Continued)

(56) References Cited

U.S. PATENT DOCUMENTS 8,830,229 B2 9/2014 Drost et al.
9,280,827 B2 3/2016 Tuzel et al.
(Continued)

FOREIGN PATENT DOCUMENTS

CN 108171733 A 6/2018
CN 111986239 A 11/2020
(Continued)

OTHER PUBLICATIONS

S. Chen, et al, (2019) "PLADE: A Plane-Based Descriptor for Point Cloud Registration With Small Overlap," in IEEE Transactions on Geoscience and Remote Sensing, vol. 58, No. 4, pp. 2530-2540.
(Continued)

*Primary Examiner* — Stephen P Coleman
(74) *Attorney, Agent, or Firm* — EAGLE IP LIMITED

(57) ABSTRACT

Computer implemented methods and computerized apparatus are provided for global registration between a first point cloud and a second point cloud obtained by a scanning device on an identical spatial scene at two separate instances. The method comprises extracting a first set of discriminative line-pairs from the first point cloud and a second set of discriminative line-pairs from the second point cloud, wherein a discriminative line-pair is a line-pair having high discriminative power compared to a randomly selected line-pair. In some embodiments, then a plurality of matching line-pair groups between the two sets of discriminative line-pairs are identified in accordance with one thresholding criterion related to between-line relationship, line geometry and line location; and a compass angle criterion related to compass errors of the scanning device. The method further comprises finding most reliable correspondence between the two point clouds by voting and then computing a global transformation matrix. Finally, the global transformation matrix is used to align the two point
(Continued)

clouds. Embodiments of the present invention provide an accurate and efficient registration especially for building construction applications.

19 Claims, 14 Drawing Sheets

(58) Field of Classification Search
USPC .......................................................... 382/100
See application file for complete search history.

(56) References Cited

U.S. PATENT DOCUMENTS

| | | |
|---|---|---|
| 10,217,277 B2 | 2/2019 | Robert et al. |
| 2015/0323672 A1 | 11/2015 | Shenkar et al. |
| 2020/0043186 A1* | 2/2020 | Selviah .................... G06T 7/33 |

FOREIGN PATENT DOCUMENTS

| | | |
|---|---|---|
| CN | 112396641 A | 2/2021 |
| WO | 2020139373 A1 | 7/2020 |

OTHER PUBLICATIONS

C. Choi, Y. Taguchi, (2012) "Voting-based pose estimation for robotic assembly using a 3D sensor," 2012 IEEE International Conference on Robotics and Automation, pp. 1724-1731.

\* cited by examiner

METHOD AND SYSTEM FOR GLOBAL REGISTRATION BETWEEN 3D SCANS

FIELD OF INVENTION

This invention generally relates to processing three-dimensional (3D) scans, in particular to a computerized method and a system for global registration between 3D scans.

BACKGROUND OF INVENTION

For visualization and further data processing of point clouds from 3D scans for an identical spatial scene, these single scans must be transformed into a common coordinate system. This process of finding a spatial transformation that aligns 3D scans is termed as "registration". Given two or more 3D point clouds that have a subset of points in common, the goal of 3D registration is to compute a rigid transformation that aligns these point clouds, providing an estimation of the relative pose between them.

There are existing approaches of registration, however, most of them have limitations on the robustness and processing time. Traditional methods may produce misalignments between two scanned 3D models due to unstable compass data or other issues. Hence, it is desirable to provide a method and system that can improve the robustness of registration in an efficient way, which yields the best alignment between these point clouds.

SUMMARY OF INVENTION

In the light of the foregoing background, alternate computer implemented methods and apparatus are provided for global registration between two point clouds obtained by a scanning device on an identical spatial scene at two separate instances.

According to an example embodiment of the present invention, a computer implemented method for global registration between two point clouds obtained by a scanning device on an identical spatial scene at two separate instances is provided. The method comprises extracting a first set of discriminative line-pairs from the first point cloud and a second set of discriminative line-pairs from the second point cloud, wherein a discriminative line-pair is a line-pair having high discriminative power compared to a randomly selected line-pair. A plurality of matching line-pair groups is then identified. Each matching line-pair group comprises a first discriminative line-pair selected from the first set of discriminative line-pairs and a second discriminative line-pair selected from the second set of discriminative line-pairs. The first discriminative line-pair and the second discriminative line-pair satisfy at least one thresholding criterion related to between-line relationship, line geometry and line location and a compass angle criterion when the first discriminative line-pair is transformed to a reference coordinate by a first transformation matrix and the second discriminative line-pair is transformed to the same reference coordinate by a second transformation matrix. Further, a best orientation angle for the first point cloud and the second point cloud derived from compass angles for the plurality of matching line-pair groups is selected, and a global transformation matrix is computed based on the best orientation angle, aggregations of respective first transformation matrices and respective second transformation matrices. The global transformation matrix is then used to align the first point cloud and the second point cloud.

Accordingly, an example embodiment of the present invention relates to a computerized system comprising a processor and a memory coupled to the processor. The memory and the processor together are configured to cause the computerized system to perform actions according to the above embodiments.

The above example embodiments have benefits and advantages over conventional technologies for point cloud registration. For example, the present method is able to find the transformation matrix for point cloud registration fast and align two models accurately by using the algorithm described herein.

Another advantage of the present invention is that the computer implemented methods are tolerant to unstable compass data of scanning devices. As a result, in 3D applications such as building construction related applications, this allows a smart 3D modelling solution for showing the comprehensive layout of building site.

BRIEF DESCRIPTION OF FIGURES

Through the following detailed description with reference to the accompanying drawings, the above and other features, advantages and aspects of embodiments of the present invention will become more apparent. In the drawings, identical or similar reference signs represent identical or similar elements, wherein.

DETAILED DESCRIPTION OF THE PREFERRED EMBODIMENTS

As used herein and in the claims, "comprising" means including the following elements but not excluding others. The term "based on" is to be read as "based at least in part on." The term "one example embodiment" and "an example embodiment" are to be read as "at least one example embodiment." The term "another embodiment" is to be read as "at least one other embodiment."

As used herein and in the claims, "a 3D object" refers to any actual object with a posture, dimension and a shape in a 3D space, which can be represented by a plurality of points in a point cloud of a scanned 3D scene.

In the context of point cloud registration of the present invention, as in an exemplary embodiment, the two point clouds to be aligned are named as "reference model" and "scene model" respectively. These two models have different postures and are from different views in a real scene. In other words, a first point cloud and a second point cloud of the two point clouds are obtained by a scanner device scanning an identical spatial scene at two separate instances, thus data from one point cloud have high degree of correspondence with data from the other point cloud.

As used herein and in the claims, "couple" or "connect" refers to electrical coupling or connection either directly or indirectly via one or more electrical means unless otherwise stated.

The following example embodiments alone or in combination may be practiced to provide methods and systems for point cloud registration in various applications for different industries such as in building construction or automation. In more particular, the lack of 3D modelling solution at present to record building sites becomes a challenge in the industry. Traditional registration methods also often cause a misalignment of two scanned 3D models due to unstable compass data of scanning device.

Figure 1:
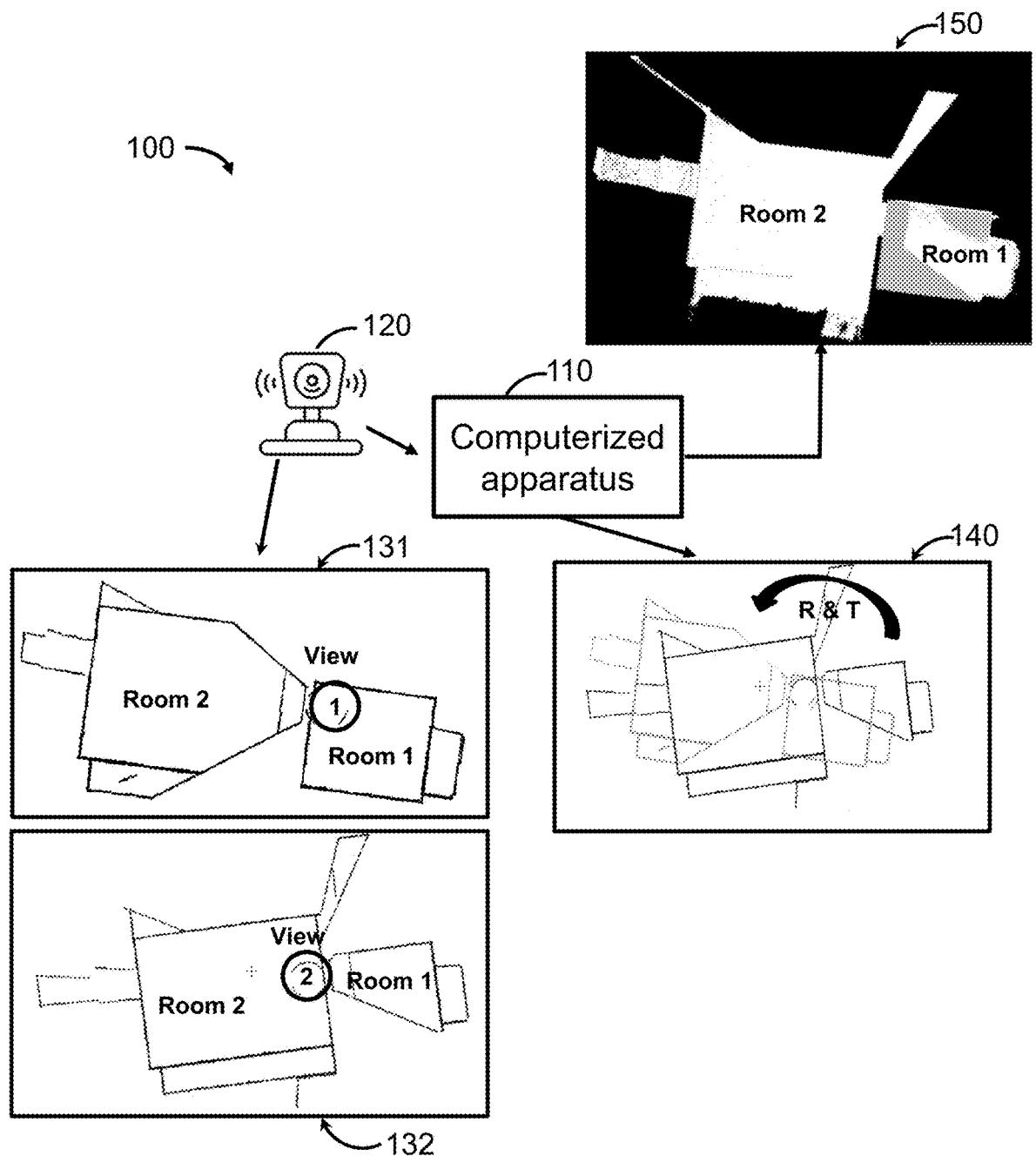
FIG. 1 illustrates one example scenario where embodiments of the present invention can be applied.

Referring now to FIG. 1, FIG. 1 shows a diagram 100 illustrating an example application scenario where embodiments of the present invention can be applied. In this scenario, a computerized apparatus 110 is provided for global registration between a first point cloud and a second point cloud obtained by a 3D sensor 120 on an identical spatial scene at two separate instances as indicated with 131 and 132. The 3D scene may be any scene in a physical environment. It is shown here as a top view of a floor plan in a building construction application, which includes one or more rooms such as Room 1 and Room 2.

One or more 3D sensors 120 are positioned to capture the 3D vision of the 3D scene and coupled with the computerized apparatus 110 to provide 3D data of the 3D scene to the computerized apparatus 110. The computerized apparatus 110 processes the 3D data for point could registration, as will be described below in detail. After point cloud registration, the result can be further processed for 3D modelling or other 3D applications.

Exemplary 3D sensors that can be used herein include, but are not limited to, 3D scanners, digital cameras, and other types of devices that are capable of capturing images of a real-world object and/or scene to collect data on its position, location, and appearance. In an exemplary embodiment, a 3D scanner is employed to scan a 3D scene to generate a point cloud. In one embodiment, the 3D scanner is a Light Detection and Ranging (LiDAR) sensor. The magnetic compass embedded in this type of 3D scanner shows cardinal directions used for navigation and geographic orientation. However, the compass data may be influenced by magnetic field(s) from nearby environmental interferences such as MRI scans, large iron or steel bodies and electrical engines nearby, resulting in unstable compass data. The maximum compass error of a scanning device is known from its hardware specification.

As shown in FIG. 1, the two separate instances 131 and 132 are indicated with two top views of the same 3D scene, where the 3D sensor 120 is positioned at a location of View 1 in Room 1 in the first instance 131, and the 3D sensor 120 is positioned at a location of View 2 in Room 2 in the second instance 132. In some embodiments, the 3D sensor 120 is a single device placed at the two locations at different times. In other embodiments, two 3D sensors 120 of similar type are positioned at the two locations.

It will be appreciated that the 3D sensor 120 captures the 3D vision of the 3D scene to provide 3D data of the 3D scene to the computerized apparatus 110. The 3D data for the two separate instances 131 and 132 may be respective point clouds. To facilitate clearly describing the present invention, a first point cloud can be generated by the 3D sensor 120 for the 3D instance 131, and a second point cloud can be generated by the 3D sensor 120 for the 3D instance 132, where the first point cloud refers to "the reference model" and the second point cloud refers to "the scene model".

It is seen that the two scanned 3D models are misaligned. The present invention with the computerized apparatus 110 enables a point cloud registration as indicated in block 140 where the scene model is aligned with the reference model by applying a Rotation and Translation (R&T) process, resulting in the aligned models as indicated in block 150. Embodiments of the present invention provide a more accurate and efficient alignment approach to compensate unstable compass data of low-end scanning device, which can achieve good performance even with a low-end scanning device with a large compass error (such as +/−30 degrees). Meanwhile the aligned models facilitate a smart 3D modelling solution for showing the skeleton of building site.

Depending on the applications, the computerized apparatus 110 may be standalone computer(s) or embedded system(s), including, but not limited to, a laptop computer, a desktop computer, a tablet computer, a smart phone, an internet appliance, an embedded devices, or the like. The 3D sensor 120 may be physically separate with the computerized apparatus 110, or collocated with or embedded into the computerized apparatus 110.

Figure 2:
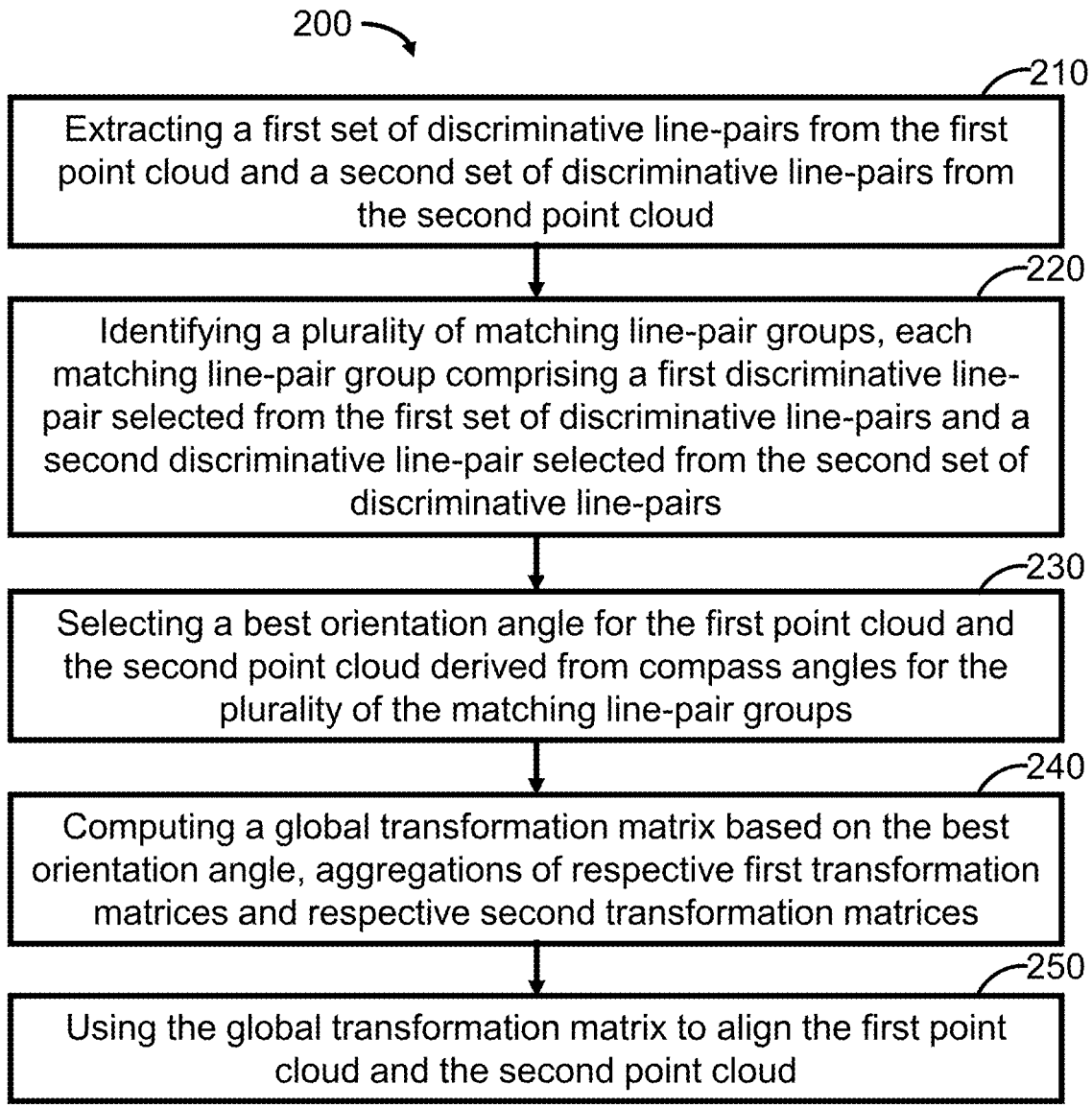
FIG. 2 is a flowchart of a method for global registration between two point clouds according to an embodiment of the present invention.
Figure 3A:
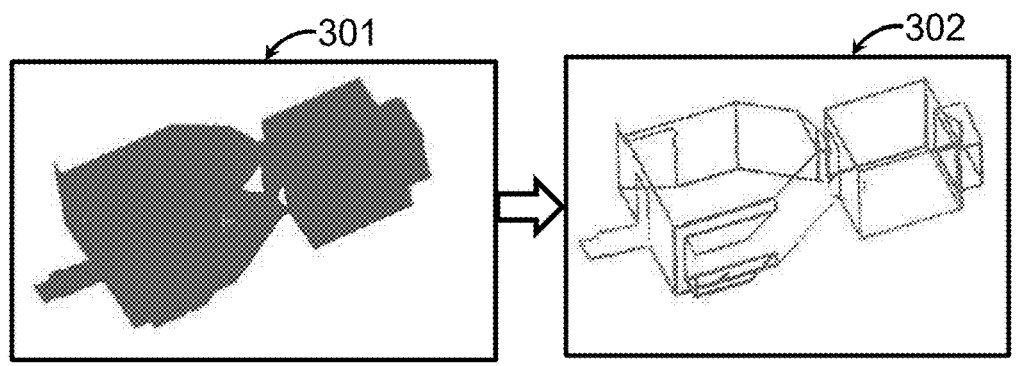
FIG. 3A illustrates a process of extracting lines from a point cloud to form a line-based model.
Figure 3B:
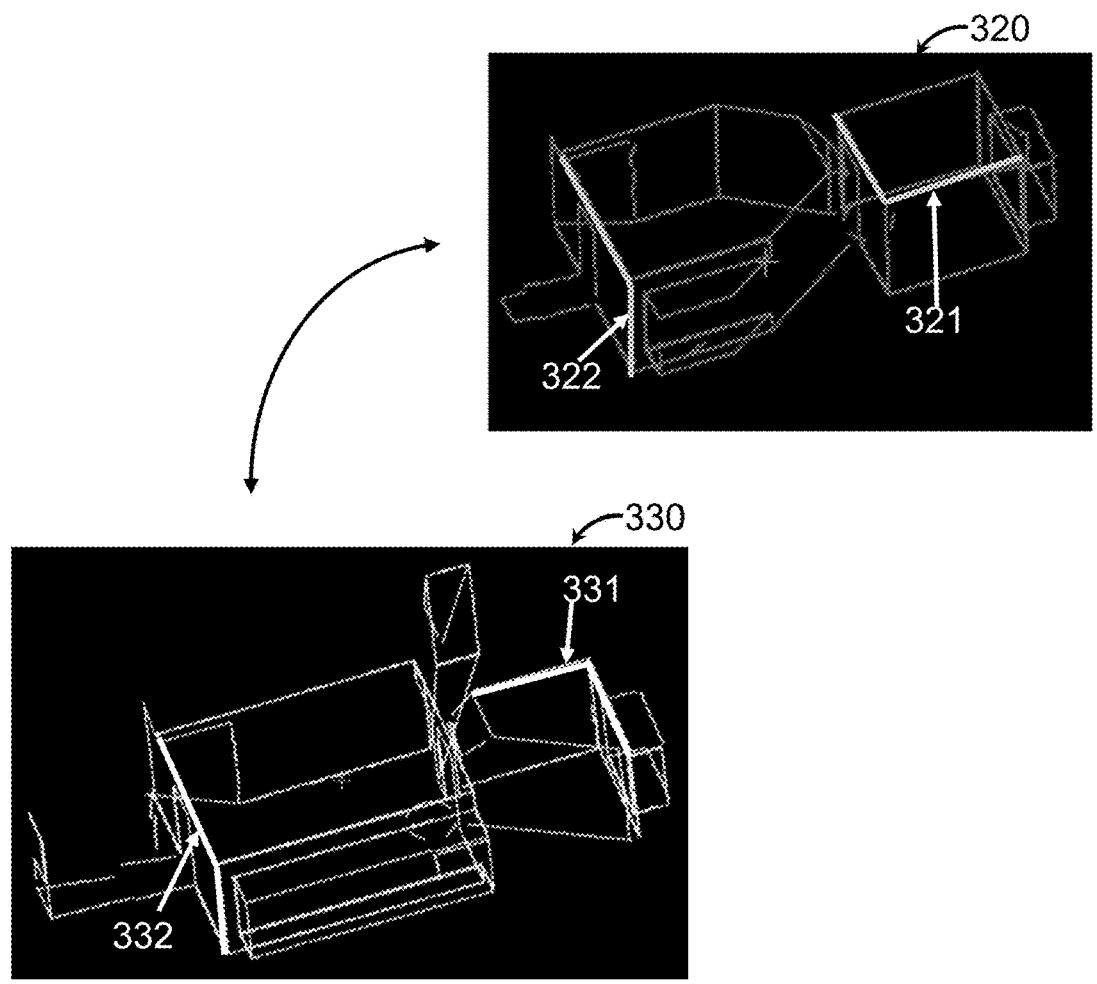
FIG. 3B illustrates one implementation of identifying the matching line-pairs from a visual perspective.

Referring now to FIG. 2 and FIGS. 3A-3B, FIG. 2 shows a process 200 according to embodiments of the present invention in several applications in connection with the scenarios represented in FIG. 1, and FIGS. 3A-3B illustrate some operations of the process 200 from a visual perspective. This process may be performed at the computerized apparatus 110 for global registration or identifying a transformation between a first point cloud and a second point cloud obtained by a scanning device 120 on an identical spatial scene at two separate instances.

At block 210, a first set of discriminative line-pairs is extracted from the first point cloud and a second set of discriminative line-pairs is extracted from the second point cloud, wherein a discriminative line-pair is a line-pair having high discriminative power compared to a randomly selected line-pair, as will be described below in detail.

The two point clouds, namely a reference model and a scene model, may be obtained by a 3D scanner on one spatial scene at two separate instances. In the embodiments of the present invention, point cloud registration is based on line-pairs, which allows an accurate and efficient registration especially in building construction applications.

Each point in a point cloud is represented by a three dimension vector, corresponding to the X-axis, Y-axis and Z-axis of the Cartesian coordinate system. Furthermore, the coordinate system is oriented in such a way that the X-Y plane corresponds to the horizontal plane of the measuring environment and the Z-axis corresponds to the vertical line perpendicular to the horizontal X-Y plane.

First, points that exhibit a straight line structure are extracted from the two point clouds, and the two point cloud models are converted to two line models in 3D space. There are a variety of methods to reliably and accurately identify lines from the point cloud and those skilled in the art can apply any one of these methods for the line extraction process. The present invention does not put any limitation in this regard. As shown in FIG. 3A, using line extraction techniques, a point-based model 301 may be converted to a line-based model 302 for further process.

Lines in each model form a set of line-pairs, a subset of which is identified as a set of discriminative line-pairs. A discriminative line-pair is a line-pair that has high discriminative power compared to a randomly selected line-pair. As an example, the discriminative power indicates a degree of similarity in 3D space between two lines in a line-pair. The less similarity between two lines in 3D space is, the higher of its discriminative power. Using a high discriminative power to select line-pairs for further process can enhance the accuracy of model alignment and the efficiency as well.

Next, at block 220, a plurality of matching line-pair groups is identified between the line-pairs in the reference model and that in the scene model. Each matching line-pair group comprises a first discriminative line-pair selected from the first set of discriminative line-pairs in the reference model and a second discriminative line-pair selected from the second set of discriminative line-pairs in the scene model.

In one embodiment, a matching line-pair group needs to satisfy the following two criteria. The first discriminative line-pair and the second discriminative line-pair need to satisfy (a) at least one thresholding criterion related to between-line relationship, line geometry and line location; and (b) a compass angle criterion when the first discriminative line-pair is transformed to a reference coordinate by a first transformation matrix and the second discriminative line-pair is transformed to the same reference coordinate by a second transformation matrix. With these criteria, a line-pair in the reference model and a line-pair in the scene model that actually refer to the same 3D portion in the real 3D scene can be well identified as potentially matched.

FIG. 3B illustrates one implementation of identifying the matching line-pairs from a visual perspective, where block 320 indicates a line-based reference model and block 330 indicates a line-based scene model. Each line model comprises a considerable amount of line-pairs, as shown in strong white lines. In block 320, two line-pairs 321 and 322 are discriminative line-pairs, and two line-pairs 331 and 332 are discriminative line-pairs as well in block 330. Through the matching process of step 220, it is determined that line-pair 322 and line-pair 332 are matched and therefore form a matching line-pair group, and line-pair 321 and line-pair 331 do not match and therefore they will not form a matching line-pair group.

In some embodiments, in order to identify matching line-pairs, corresponding transformation matrix is computed for each line-pair from the two sets of discriminative line-pairs, so that each line-pair is transformed to a same reference coordinate in a similar way in terms of respect axis. Those transformation matrices computed for respective line-pair from the first set of discriminative line-pairs refer to respective first transformation matrices, and those transformation matrices computed for respective line-pair from the second set of discriminative line-pairs refer to respective second transformation matrices.

At block 230, a best orientation angle for the first point cloud and the second point cloud derived from compass angles for the plurality of matching line-pair groups is selected. For each matching line-pair group comprising one line-pair from the reference model and one line-pair from the scene model, an orientation angle between the two line-pairs is computed, indicating a relative orientation between them within a same 3D space. Then a best orientation angle is selected from all these orientation angles computed for all the matching line-pair groups. In one embodiment, the selection is done by a voting scheme. This best orientation angle yields the best estimation of compass error occurred with the 3D scanner.

At block 240, a global transformation matrix is computed based on the best orientation angle, aggregations of respective first transformation matrices and respective second transformation matrices. Then at block 250, the global transformation matrix is used to align the first point cloud and the second point cloud. The point cloud registration between the reference model and the scene model can be performed with the computed global transformation matrix. As a result of the registration, the aligned models may be further proceeded for 3D modelling and other applications.

It will be noted that, though the operations are described above in a specific order, the operations are not necessarily performed following the above particular order. For example, some operations may be performed in a multi-task manner or in parallel.

In some embodiments, especially in building construction scenario, lines in a line-based 3D model can be categorized as a vertical line (V-line), a horizontal line (H-line) or neither of them. The following paragraphs give a detailed description of point, line and plane in 3D space to characterize the V-line and H-line. Further, embodiments of the present invention use this characterization for building up discriminative line-pairs.

It is known that any point Q on the line can be expressed by the following equation:

$$Q=P+td$$

where P is a point on the line, d is the direction vector and t is a scalar real number.

A line is referred to as a vertical line if the direction vector of this line is close to the direction of the Z-axis. In one embodiment as an example, when the acute angle between d or −d and the Z-axis is less than κ degrees, this line is categorized as a vertical line (V-line). Similarly, in one embodiment as an example, a line is referred to as a horizontal line (H-line) if the angle between d (or −d) and the Z-axis is within the range of 85 and 95 degrees. Within this tolerance, the horizontal line is considered lying on a horizontal X-Y plane. Different horizontal lines may lie on different horizontal planes, each plane having a different vertical value on the Z-axis. Two horizontal lines are called non-parallel if these two lines are mapped to a reference horizontal X-Y plane and the mapped lines are not parallel to each other within this reference horizontal plane. In one embodiment as an example, this means that two non-horizontal lines will intersect when they are mapped to the same reference horizontal plane and the acute angle formed by these two lines may be more than 20 degrees. However, it will be appreciated that in general, the non-parallel horizontal lines do not necessarily lie on one same horizontal X-Y plane in the 3D space.

Figure 4A:
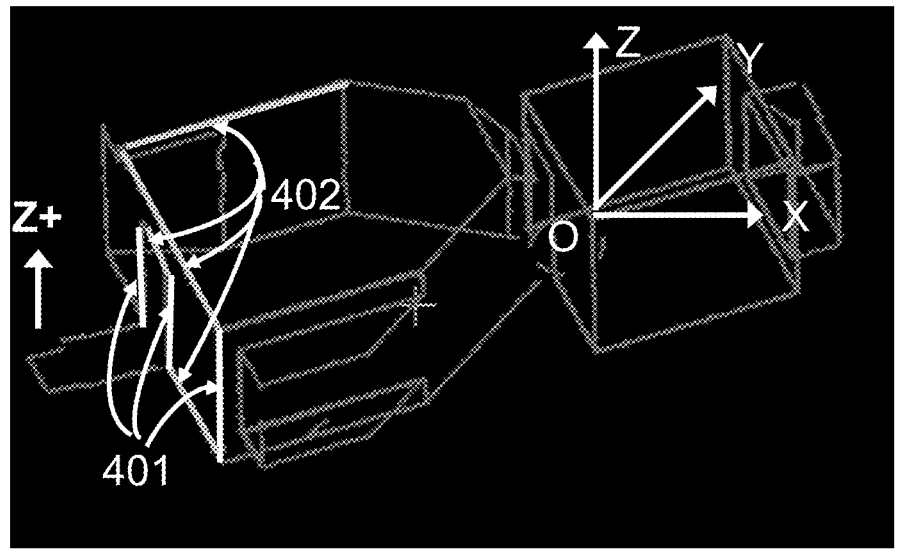
FIGS. 4A-4B illustrate H-lines and V-lines in line-based 3D models and an example of discriminative line-pairs in the context of such models.
Figure 4B:
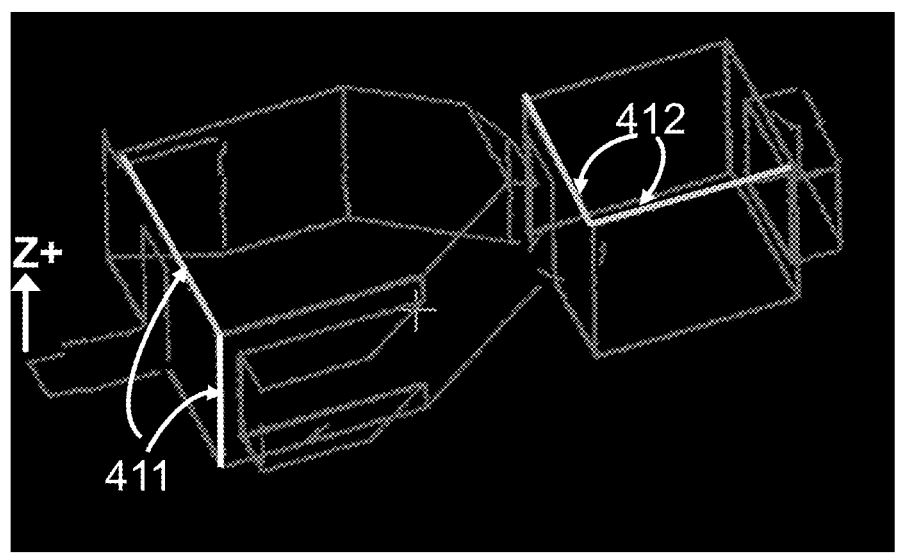

FIGS. 4A-4B illustrate H-lines and V-lines in line-based 3D models and an example of discriminative line-pairs in the context of such models. As shown in FIG. 4A, in the X-axis, Y-axis and Z-axis of the Cartesian coordinate system with an original point O at the location of the 3D scanner, those lines indicated with reference 401 are vertical lines, and those lines indicated with reference 402 are horizontal lines.

In one embodiment, a discriminative line-pair comprises one V-line and one H-line, or two non-parallel H-lines, as shown in FIG. 4B. The discriminative line-pair 411 comprises one V-line and one H-line, while the discriminative line-pair 412 comprises two non-parallel H-lines. Experimental results show that these choices of discriminative line-pairs have higher discriminative power compared to other combinations, such as two V-lines, two parallel H-lines or other randomly selected line-pairs.

In some embodiments of the present invention, each line-pair in a 3D model is represented a line-pair feature vector, consisting one or more line-pair features. The line-pair feature may be related to between-line relationship, line geometry and line location. In one embodiment, the line-pair feature vector of line-pair (Lp, Lq) is a 6×1 vector I(dc, angle(lp, lq), len_p, len_q, z_p, z_q), where dc is the minimum distance between the two 3D lines of a line-pair and angle(lp, lq) is the acute angle between the two lines indicate between-line relationship of a line-pair;

len_p is the length of line p and len_q is the length of line q indicate line geometry of a line-pair; and z_p is the vertical value (i.e., along Z-axis in a Cartesian coordinate) of center point of line p and z_q is the vertical value of center point of line q indicate line locations.

Figure 5A:
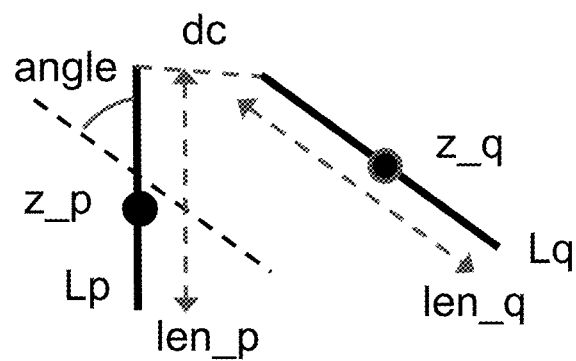
FIGS. 5A-5B show two examples of line-pair features.
Figure 5B:
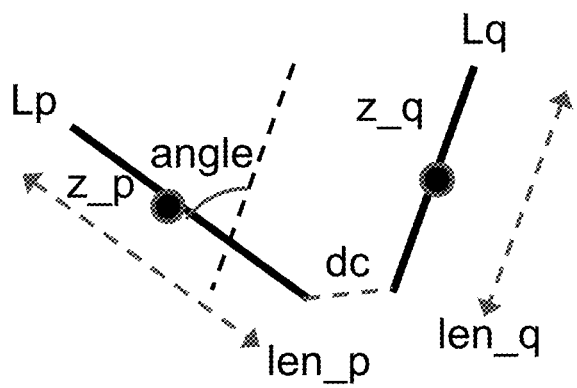

FIGS. 5A-5B show two examples of line-pair features. FIG. 5A and FIG. 5B respectively show a line-pair comprising line Lp and line Lq. For each line-pair, its line-pair feature is computed, including computing a minimum distance, an acute angle between a first line Lp and a second line Lq, the lengths of line Lp and line Lq, and the locations of center points of line Lp and line Lq.

For each discriminative line-pair, its corresponding line-pair feature vector is computed for further processing on finding matched line-pairs between the reference model and the scene model. FIG. 6A-FIG. 11B show some example embodiments for identifying matching line-pair groups in connection with step 220 as described above.

In some embodiments, identifying matching line-pair groups between two models involves at least one of the following: using at least one thresholding criterion related to line-pair feature to filter out mismatched line-pairs; and using a compass angle criterion to filter out mismatched line-pairs. Below will discuss a process of using these two criteria together to find the matching line-pairs. It will be appreciated that either can serve as an approach for this purpose, i.e., either approach can be used in stand-alone mode or in combination.

In one embodiment, the thresholding criterion relates to differences between the line-pair feature vector of the first discriminative line-pair from the reference model and the line-pair feature vector of the second discriminative line-pair from the scene model. In one embodiment, the thresholding criterion further comprises the following sub-criteria:

an absolute difference between the minimum distance of the first discriminative line-pair and that of the second discriminative line-pair is less than a first pre-determined threshold;

an absolute difference between the length of the first line of the first discriminative line-pair and length of the first line of the second discriminative line-pair is less than a second pre-determined threshold;

an absolute difference between the length of the second line of the first discriminative line-pair and length of the second line of the second discriminative line-pair is less than a third pre-determined threshold;

an absolute difference between a vertical value of a center point of the first line of the first discriminative line-pair and a vertical value of a center point of the first line of the second discriminative line-pair is less than a fourth pre-determined threshold;

an absolute difference between a vertical value of a center point of the second line of the first discriminative line-pair and a vertical value of a center point of the second line of the second discriminative line-pair is less than a fifth pre-determined threshold; and an absolute difference between the acute angle of the first discriminative line-pair and the acute angle of the second discriminative line-pair is less than a sixth pre-determined threshold. Only when this set of sub-criteria is met, the two line-pairs are matching with each other and they form a matching line-pair group. It would be appreciated that the values of each or some of the first pre-determined threshold to the fifth pre-determined threshold may be the same or different with others.

Figure 6A:
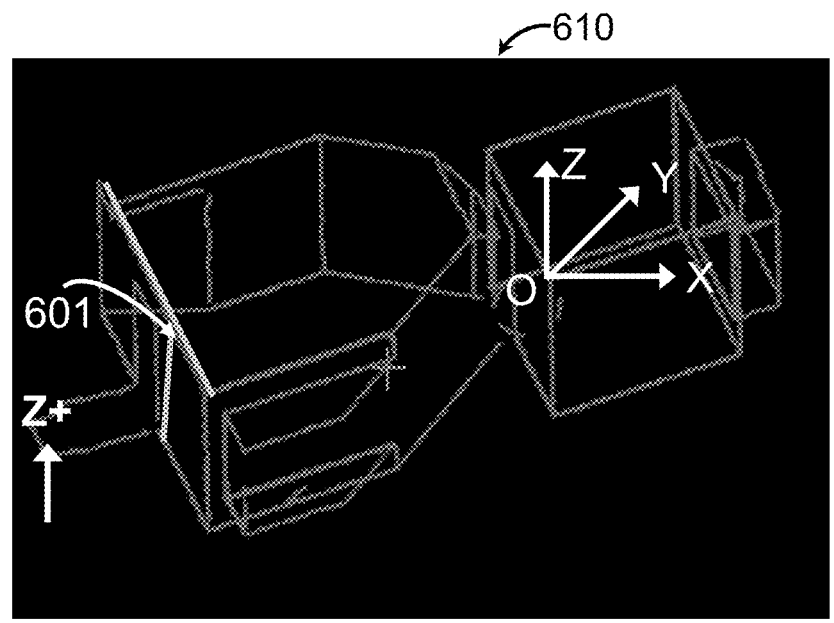
FIGS. 6A-6B show line-pairs consisting of V-line and H-line in two models.
Figure 6B:
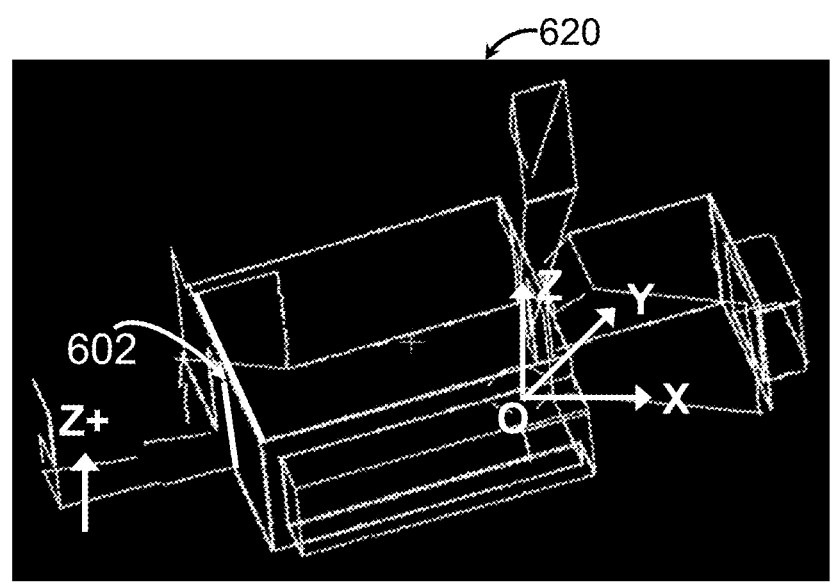

FIGS. 6A-6B show line-pairs consisting of V-line and H-line in two models. As seen, the two diagrams respectively illustrate line-based 3D models, i.e., the reference model 610 and the scene model 620. For each line-pair, such as line-pair 601 consisting of a V-line and an H-line, from the first set of discriminative line-pairs in the reference model 610, its line-pair feature vector is compared with the respective line-pair feature vectors of line-pairs from the second set of discriminative line-pairs in the scene model 620. Then, one or more line-pairs from the scene model 620 can be determined as a candidate of matching line-pairs to line-pair 601 if the line-pair feature vector of line-pair 601 and the one or more feature vectors of the second discriminative line-pairs meet the above thresholding criterion.

As an example, the line-pair feature vector of line-pair 601 can be calculated and denoted as Ig (dc_g, angle_g, len_p_g, len_q_g, z_p_g, z_q_g) where the definition of each element is the same as discussed above. The line-pairs of the scene model can be calculated and denoted similarly. There may exist line-pair 602 and other line-pairs in the scene model 620 consisting of a V-line and an H-line as well, and its line-pair feature vector is denoted as Is (dc_s, angle_s, len_p_s, len_q_s, zps, z_q_s).

If line-pair feature vectors of line-pair 601 and line-pair 602 meet all the following conditions, then they are declared as matching line-pairs.

|dc_s−dc_g|<$D_1$_threshold,
|angle_s−angle_g|<A_threshold
|len_p_s−len_p_g|<$D_2$_threshold,
|len_q_s−len_q_g|<$D_3$_threshold
|z_p_s−z_p_g|<$D_4$_threshold,
|z_q_s−z_q_g|<$D_5$_threshold where |x| is absolute value of x, $D_i$_threshold ($1<=i<=5$) as an example may be around 10 cm and A_threshold as an example may be around 4 degrees.

Figure 7A:
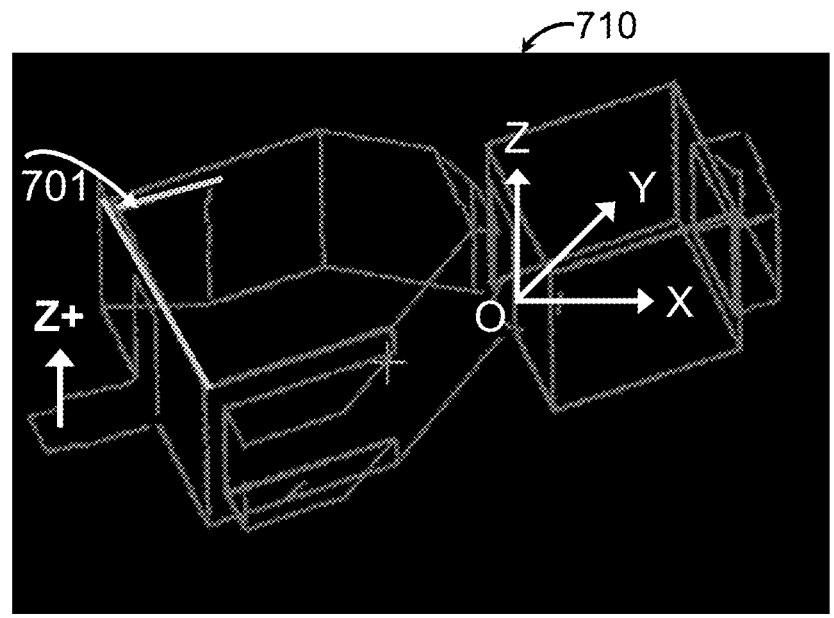
FIGS. 7A-7B show line-pairs consisting of two non-parallel H-lines in two models.
Figure 7B:
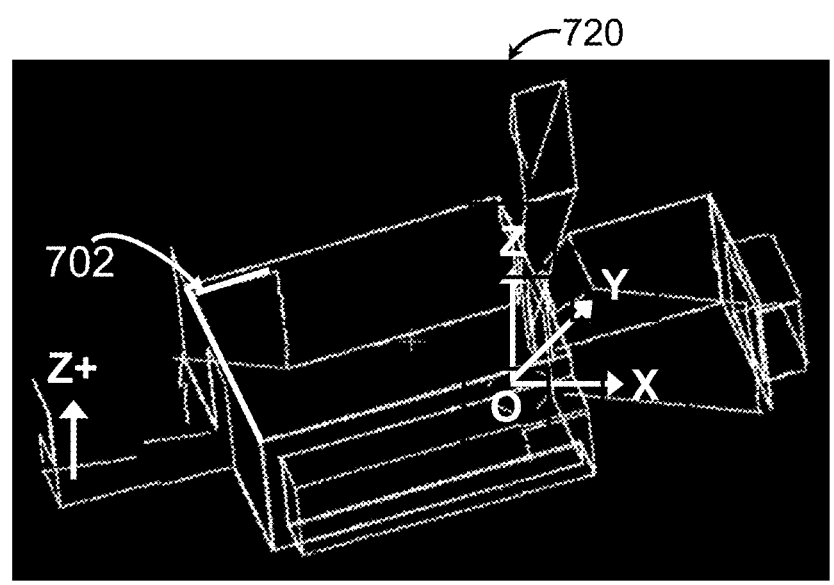

Similarly, for a discriminative line-pair consisting of two non-parallel H-lines, the same process is performed. As shown in FIGS. 7A-7B, the two diagrams respectively illustrate line-based 3D models, i.e., the reference model 710 and the scene model 720. For a line-pair 701 consisting of two non-parallel H-lines in the reference model 710, another line-pair 702 in the scene model 720 may be identified as matching with line-pair 701 if the line-pair feature vectors of them meet the above thresholding criterion.

In this way, a plurality of matching line-pair groups is identified between the line-pairs in the reference model and that in the scene model. Each matching line-pair group comprises a first discriminative line-pair selected from the first set of discriminative line-pairs in the reference model and a second discriminative line-pair selected from the second set of discriminative line-pairs in the scene model.

Further with applying a compass angle criterion on the matching line-pair groups, some of the discriminative line-pairs will be filtered out and only most reliable ones will be kept for further processing.

FIGS. 8A-9B show an example in connection with line-pairs in FIGS. 6A-6B and the application of the compass angle criterion. Line-pair 601 is from the reference model consisting of a V-line and an H-line, and line-pair 602 is from the scene model consisting of a V-line and an H-line. Both models are mapped in a same reference coordinate system. In addition, the two line-pairs may have been identified as matching line-pairs in accordance with the above process.

Next, for each matching line-pair group comprising at least two discriminative line-pairs from the two models, a first transformation matrix for the first discriminative line-pair is computed, such that a first line of the first discriminative line-pair is aligned with X-axis of the reference coordinate; and a second transformation matrix for the second discriminative line-pair is computed such that a first line of the second discriminative line-pair is aligned with X-axis of the reference coordinate.

Figure 8A:
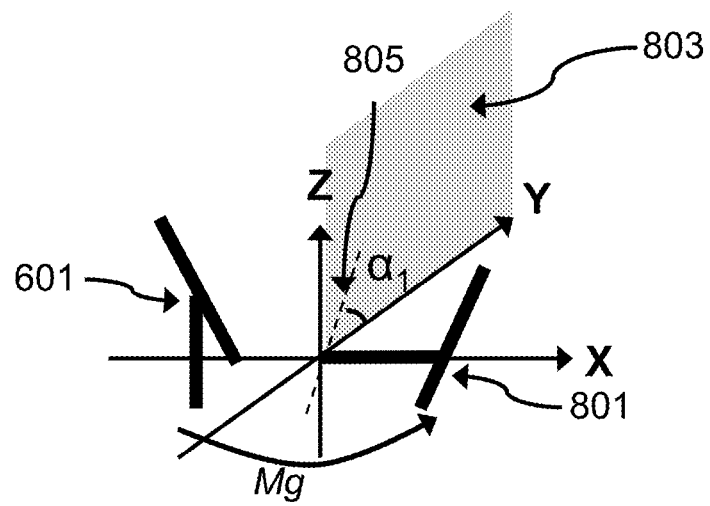
FIGS. 8A-9B show an example in connection with line-pairs in FIGS. 6A-6B and the application of the compass angle criterion.

In the example of FIG. 8A, a transform matrix Mg is computed, such that applying Mg on line-pair 601 maps it to line-pair 801 in the reference coordinate system. Here the first line of line-pair 601 is mapped to a line aligned with the X-axis and the second line of line-pair 601 is likewise mapped to the second line of line-pair 801 in the reference coordinate system. As the requirement of mapping the first line to the X-axis will uniquely define the transform matrix Mg, this second line has a specific direction or orientation after the mapping. A projection of this line onto the Y-Z plane 803 is computed, resulting a projected line 805 on the Y-Z plane of this reference coordinate system. Then the acute angle $\alpha_1$ between the projected line 805 and the Y-axis can be calculated.

Figure 8B:
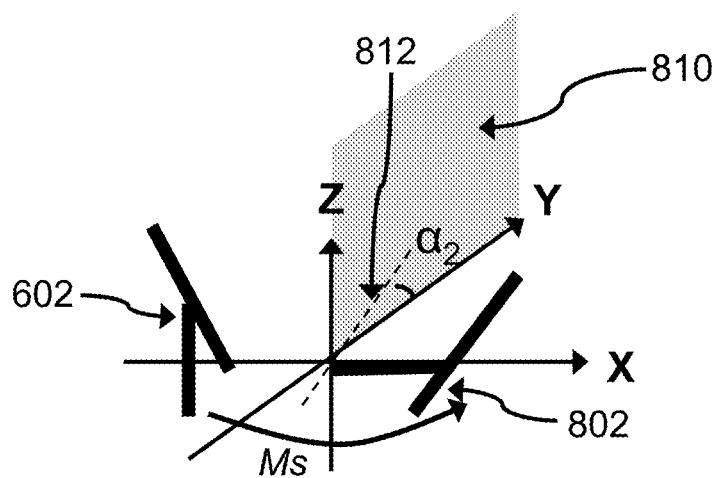

Similarly, as shown in FIG. 8B, a transform matrix Ms is computed so that line-pair 602 is mapped to line-pair 802, allowing one line of line-pair 602 to be aligned with X-axis of the same reference coordinate. The other line of line-pair 802 then is projected to Y-Z plane 810, generating a projected line shown as reference 812. The projected line 812 is the projection of the second line onto the Y-Z plane 810. As a result, an acute angle $\alpha_2$ between the projected line 812 on the Y-Z plane and the Y-axis can be calculated.

It will be appreciated that the derivation of the transformation matrices Mg and Ms and the calculations of the projection lines as well as the acute angles $\alpha_1$ and $\alpha_2$ are common knowledge to those skilled in the art and will not be elaborated here An absolute angle difference $\alpha$ between the two angles $\alpha_1$ and $\alpha_2$ is then used as a condition of the compass angle criterion. This angle difference $\alpha$ represents a rotation of the line-pairs around Z-axis. In one embodiment, if $|\alpha_1 - \alpha_2| \leq \alpha_{max}$, the two line-pairs are kept as matching line-pairs in a matching line-pair group; and if $|\alpha_1 - \alpha_2| > \alpha_{max}$, the two line-pairs are not considered as matching line-pairs and may be removed from a matching line-pair group. Here, $\alpha_{max}$ is the maximum compass error of the 3D scanner which is known from its hardware specification. Other threshold smaller than the maximum compass error of the scanning device is also applicable.

Figure 9A:
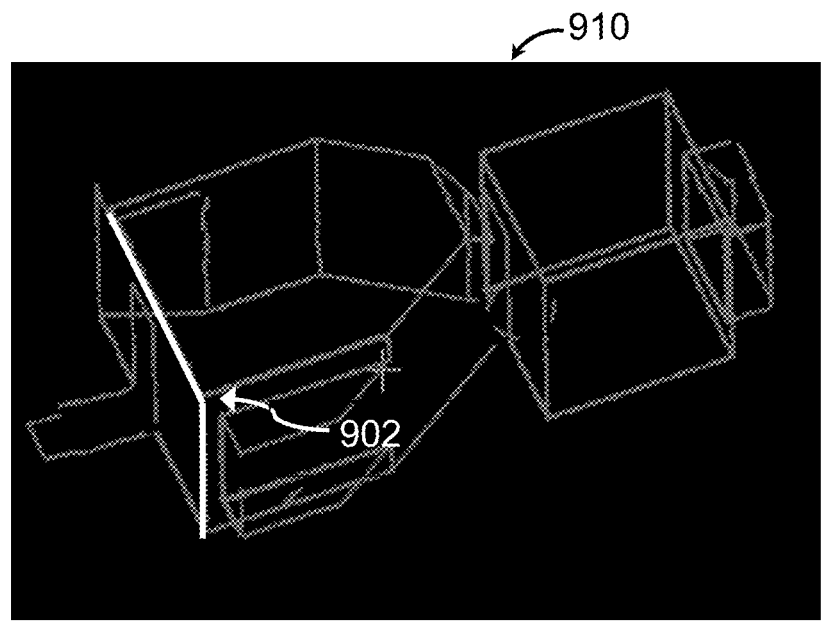
Figure 9B:
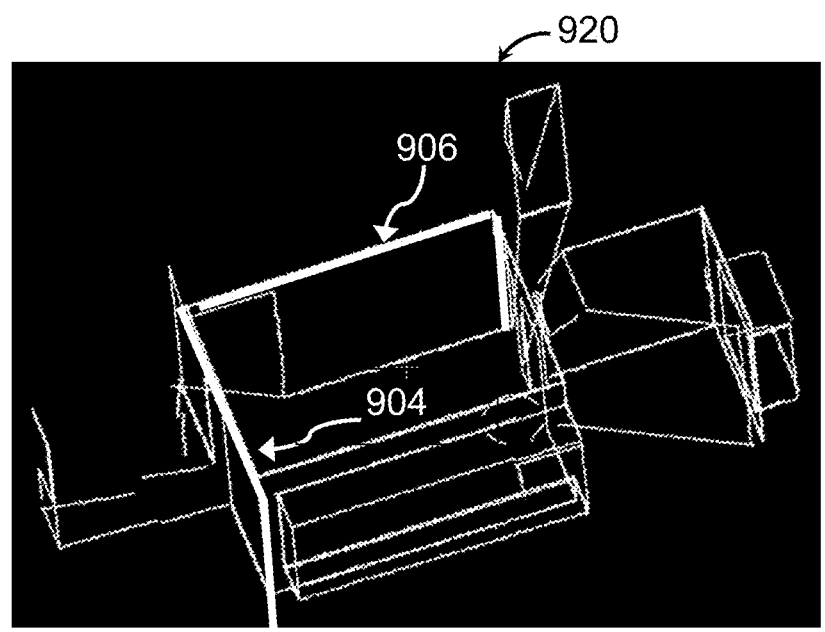

FIGS. 9A-9B show an example from a more visual perspective, where a discriminative line-pair 902 is identified in the reference model 910, and two discriminative line-pairs 904 and 906 are identified in the scene model 920. The absolute angle difference between line-pair 902 and line-pair 904 and the absolute angle difference between line-pair 902 and line-pair 906 are respectively calculated in accordance with the process described above. When the compass angle criterion is applied, as the absolute angle difference between line-pair 902 and line-pair 904 is less than $\alpha_{max}$, these two pairs will be kept as matching line-pairs in a matching line-pair group. However, as the absolute angle difference between line-pair 902 and line-pair 906 is greater than $\alpha_{max}$, these two pairs will be removed from any matching line-pair group.

FIGS. 10A-11B show another example in connection with line-pairs in FIGS. 7A-7B and the application of the compass angle criterion. A discriminative line-pair 701 is from the reference model consisting of two non-parallel H-lines, and a discriminative line-pair 702 is from the scene model consisting of a two non-parallel H-lines. Both models are mapped in a same reference coordinate system.

In accordance with similar process as above, a transform matrix Mg is computed, and line-pair 701 is transformed to line-pair 1001 by applying the transform matrix Mg to all the points to line-pair 701 so that one line in line-pair 1001 aligns with the X-axis while the other line is a line with specific orientation in the reference coordinate system. This other line of line-pair 1001 is then projected to Y-Z plane 1003, generating a projected line shown as reference 1005. As a result, an acute angle $\alpha_3$ between the projected line 1005 on the Y-Z plane 1003 and the Y-axis can be calculated.

Figure 10A:
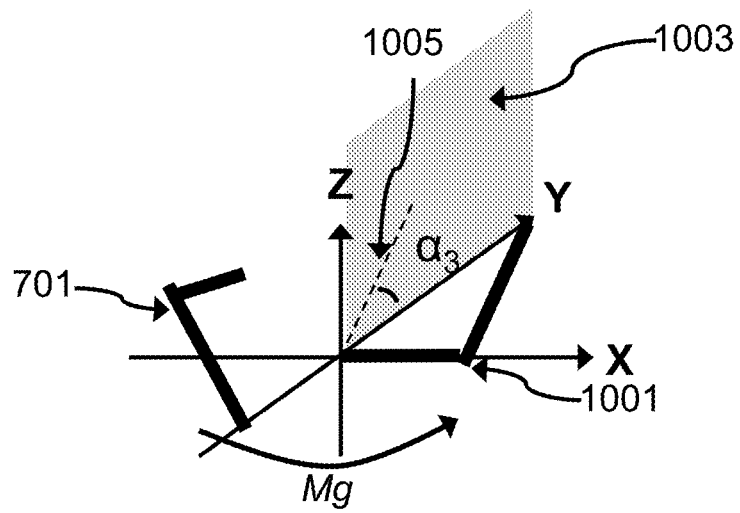
FIGS. 10A-11B show another example in connection with line-pairs in FIGS. 7A-7B and the application of the compass angle criterion.
Figure 10B:
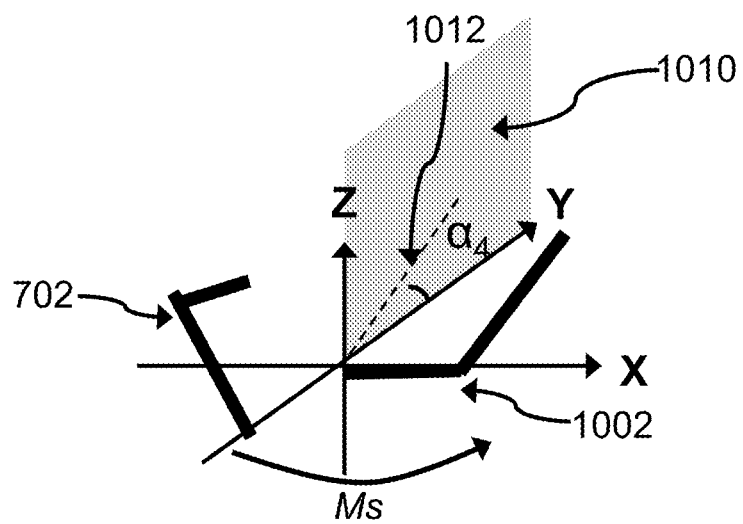

Similarly, as shown in FIG. 10B, a transform matrix Ms is computed and applied on line-pair 702 to transform it to line-pair 1002. The other line of line-pair 1002 then is projected to Y-Z plane 1010, generating a projected line shown as reference 1012. The projected line 1012 is the projection of the second line onto the Y-Z plane 1010. As a result, an acute angle $\alpha_4$ between the projected line 1012 on the Y-Z plane 1010 and the Y-axis can be calculated.

Figure 11A:
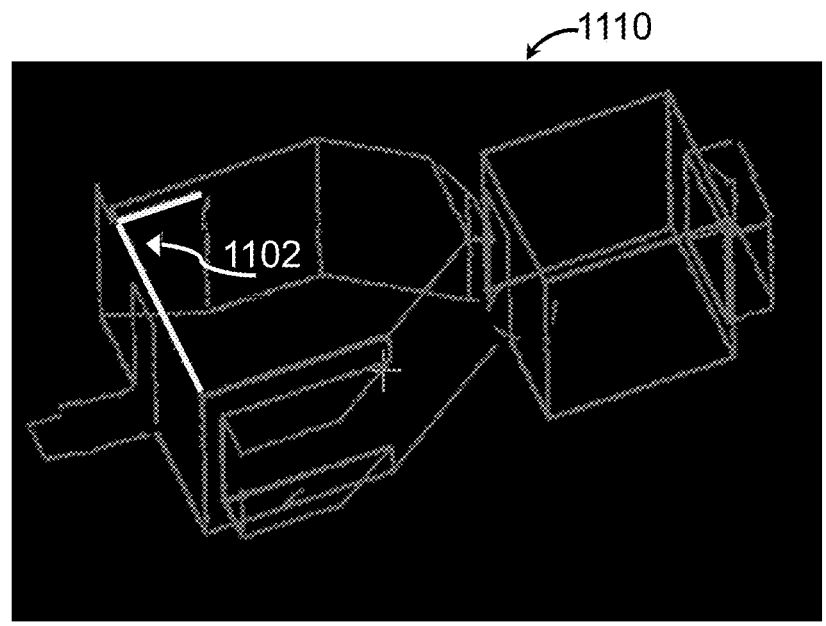
Figure 11B:
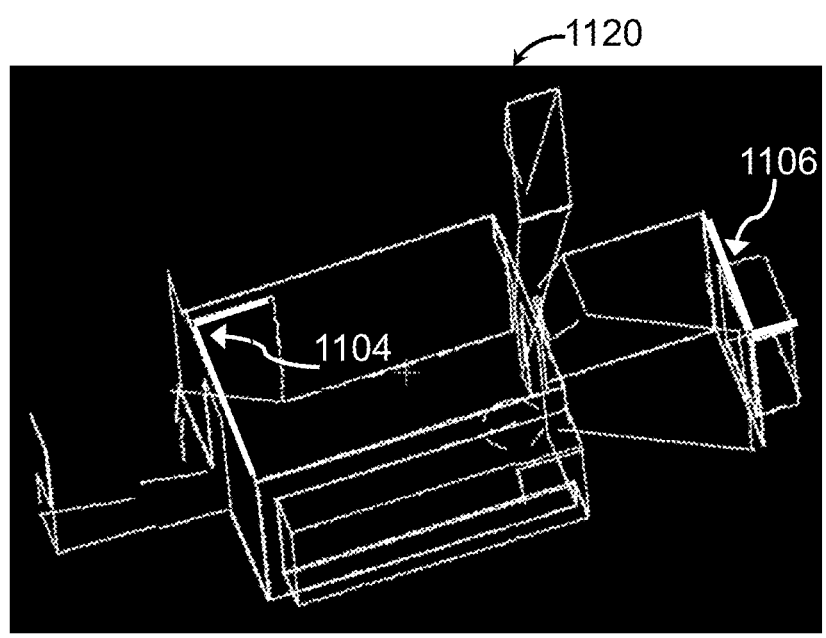

FIGS. 11A-11B show an example from a more visual perspective, where a discriminative line-pair 1102 is identified in the reference model 1110, and two discriminative line-pairs 1104 and 1106 are identified in the scene model 1120. When the compass angle criterion is applied, as the absolute angle difference between line-pair 1102 and line-pair 1104 is less than $\alpha_{max}$, these two pairs will be kept as matching line-pairs in a matching line-pair group. However, as the absolute angle difference between line-pair 1102 and line-pair 1106 is greater than $\alpha_{max}$, these two pairs will be removed from any matching line-pair group.

After the reliable matching line-pairs are identified, one compass angle difference from the calculated compass angle differences is selected as the best orientation angle between the reference model and the scene model by a voting scheme among all discriminative line-pairs of the plurality of matching line-pair groups.

Figure 12:
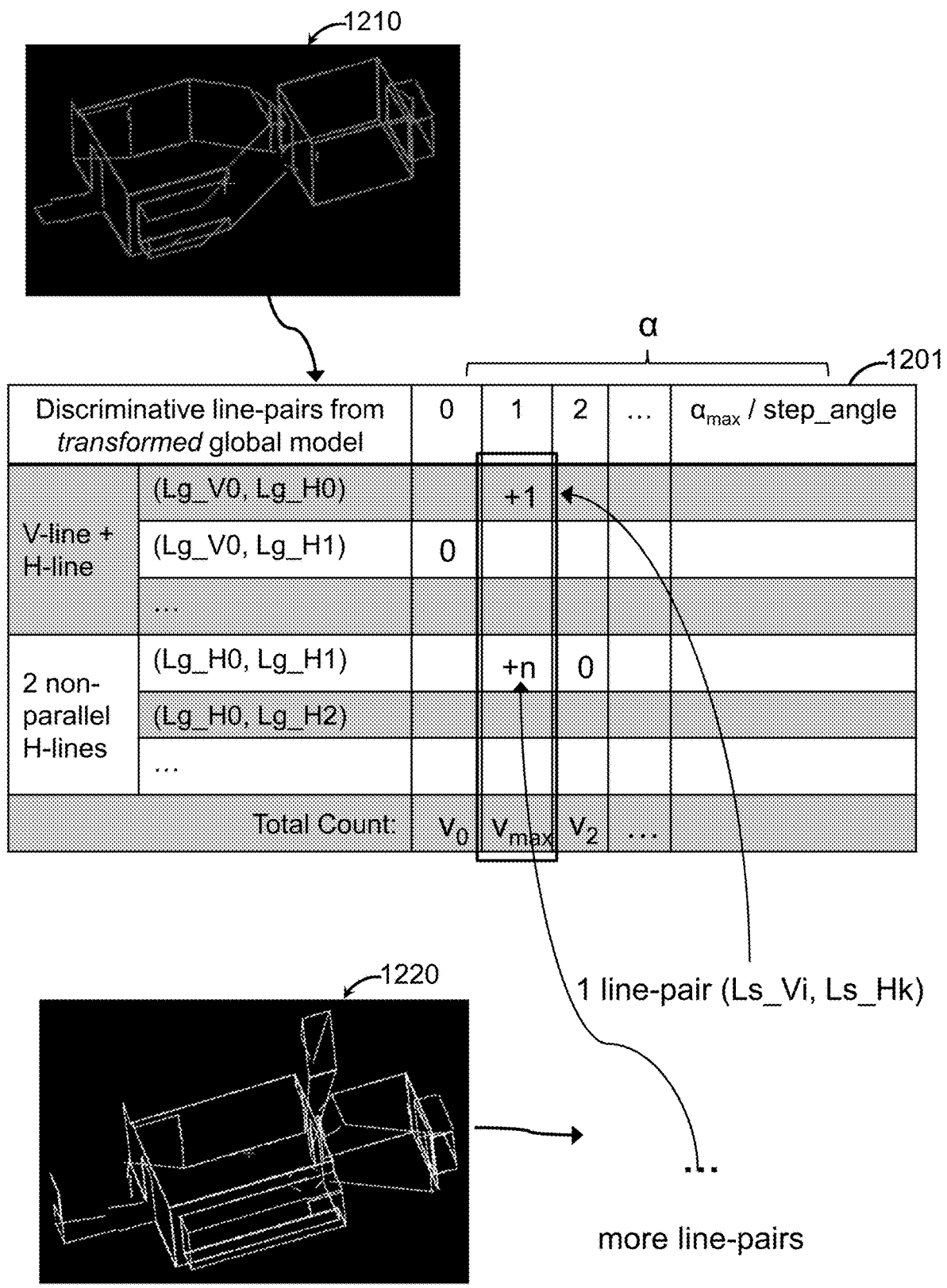
FIG. 12 shows an example of a voting scheme for selection of a best orientation angle in one embodiment.

FIG. 12 shows an example of the voting scheme in one embodiment. In this voting scheme a voting table 1201 is established, where rows of the voting table indicate the set of discriminative line-pairs from the reference model 1210, columns of the voting table indicate a finite number of angular bins corresponding to quantized absolute compass angle differences α, and all cells in the voting tables are initialized to zero. Here, the set of discriminative line-pairs from the scene model 1220 are used to vote and the compass angle difference α that receives the highest number of votes is selected as the best orientation angle. The line-pairs may be those transformed line-pairs being transformed to the reference coordinate.

As one exemplary implementation for voting, the compass angle difference is quantized by up to $\alpha_{max}$/step_angle to obtain the angular bin number and the angular bin number is used as column index of the voting table, where step_angle is a predefined value such as 4 degrees.

For each row in the voting table (which corresponds to a discriminative line-pair from the reference model 1210), a candidate set of discriminative line-pairs from the scene model 1220 are identified from the plurality of matching line-pair groups. For each entry in the candidate set, the compass angle difference α between the discriminative line-pair from the scene model corresponding to this entry and the discriminative line-pair from the reference model corresponding to this row is retrieved. In one embodiment, if the retrieved compass angle difference falls into a particular angular bin of this row, the value of voting table cell corresponding to this angular bin of this row is set to one. In another embodiment, the value of the voting table cell is incremented. As an example as shown in FIG. 12, some of the voting table cells have a value of zero or one, while others have a value of a positive integer+n.

After all the rows are processed, the cell values for each column are tallied up, representing the total count of this column. A new row is created and appended to this table to store these counts. A compass angle difference corresponding to a column having the maximum count value is identified as the best orientation angle. As an example shown in FIG. 12, the cumulative counts $V_i$ (0<=i<=($\alpha_{max}$/step_angle)) for the $i^{th}$ column is stored at the last row of the table. In this example, angular bin "1" has the maximum value Vmax, and thus the corresponding quantized compass angle difference α is identified as the best orientation angle.

In some embodiments, as stated in connection with blocks 240 and 250 of FIG. 2, a global transformation matrix is computed based on the best orientation angle, aggregations of transformation matrices (e.g., Mg) used for transforming line-pairs in the reference model, and transformation matrices (e.g., Ms) used for transforming line-pairs in the scene model. As an example, a candidate set of the global transformation matrices M is obtained. Here M is a function of the aforementioned parameters and can be represented as $$M=F(Mgi, R(\alpha_0), Msi)$$

where $\alpha_0$ is the best orientation angle found by the above voting scheme, Mgi is an aggregation of transformation matrices used for transforming line-pairs in the reference model and having a non-zero value within the table column corresponding to the best orientation angle, Msi is an aggregation of transformation matrices from the same table column and used for transforming line-pairs in the scene model, and i is the number of discriminative line-pairs in the scene model.

Then an estimated pose for each line in the plurality of matching line-pair groups from the second set of discriminative line-pairs is computed by using corresponding transformation matrices from the candidate set M. Line clusters from the second set of discriminative line-pairs in the scene model are formed by finding similar estimated pose, and an averaged transformation matrix of the line clusters is obtained as the final global transformation matrix.

The final global transformation matrix is used to align the reference model and the scene model. The point cloud registration between the reference model and the scene model can be performed based on the computed global transformation matrix. As a result of the registration, the aligned models may be further proceeded for 3D modelling and other applications.

The following Tables 1-3 show some comparative experimental results between the embodiments of the present invention and other traditional methods. As shown in Table 1 below, five between-room registration tests using LiDar scanning data have been run between a traditional method where other line-based approach is used and the method of the present invention.

TABLE 1

Five between-room registration results

| | | Traditional method(A) | Our proposed method(B) | Difference between two methods (A minus 8) |
|---|---|---|---|---|
| Test1 | Matched Line Pair | 9,896 (37.94%) | 416 (2.52%) | 9,480 (35.42%) |
| | Total Line Pair | 26,082 | 16,512 | 9,570 |
| Test2 | Matched Line Pair | 8,030 (33.21%) | 380 (3.06%) | 7,650 (30.15%) |
| | Total Line Pair | 24,180 | 12,432 | 11,748 |
| Test3 | Matched Line Pair | 9,046 (38.90%) | 851 (6.97%) | 8,195 (31.93%) |
| | Total Line Pair | 23,256 | 12,210 | 11,046 |
| Test4 | Matched Line Pair | 9,446 (39.07%) | 717 (4.86%) | 8.729 (34.21%) |
| | Total Line Pair | 24,180 | 14,782 | 9,418 |
| Test5 | Matched Line Pair | 8,592 (32.94%) | 345 (2.42%) | 8,247 (30.52%) |
| | Total Line Pair | 26,082 | 14,280 | 11,802 |

Even though the traditional method uses significant more line-pairs, which inevitably slows down the registration process, the tests show that 95% of matched line-pairs found by the present invention are the actual line-pairs of the actual physical scene.

Tables 2-3 show comparative data for pose estimation errors between the traditional method where other line-based approach is used and the method of the present invention.

TABLE 2

Pose Estimation Errors
Rotation (x, y, z axis in degree)

| | Traditional method | Our proposed method |
|---|---|---|
| Test1 | −1.161, 1.549, −1.692 | 0.035, −0.052, 1.070 |
| Test2 | 0.401, −3.692, −0.926 | 0.933, −0.070, 0.662 |
| Test3 | 0.010, −7.308, 2.273 | 0.211, 0.394, 0.356 |
| Test4 | 9.482, −2.252, −3.624 | 0.446, −0.242, 0.971 |
| Test5 | −3.173, −7.726, −0.921 | −0.076, −0.042, 2.221 |

TABLE 3

Pose Estimation Errors
Translation (x, y, z axis in cm)

| | Traditional method | Our proposed method |
|---|---|---|
| Test1 | −11.62, 40.22, −10.41 | −0.93, 4.39, −1.01 |
| Test2 | 4.62, 32.08, 11.41 | 0.55, 0.46, 3.13 |

TABLE 3-continued

| | Pose Estimation Errors Translation (x, y, z axis in cm) | |
| --- | --- | --- |
| | Traditional method | Our proposed method |
| Test3 | 0.40, 24.50, −13.44 | 2.52, −2.55, −2.64 |
| Test4 | −38.99, 31.39, −34.26 | −2.51, 0.98, 0.62 |
| Test5 | 34.48, −7.77, 8.40 | −0.20, 5.54, 0.08 |

As seen in Table 2, the same five tests have been run and most of the rotation errors using traditional method are over 1 degree, while very few of the rotation errors using the method of the present invention are over 1 degree. Table 3 shows comparison in translation errors. Most of the translation errors under traditional method are over 5 cm, while very few of the translation errors using the method of the present invention are over 5 cm. This proves that fine alignment process, such as Iterative closest point (ICP), can be omitted after employing the method of the present invention.

Another experiment using different 3D scans has been conducted to look into the processing time. The experiment is run on a computer employing an 8-core i7 Intel processor running at 3.5 GHz frequency and using 64G RAM. One scan comprises 19,105,334 points and the other comprises 17,795,259 points. In both cases, the processing time is about 0.5 s. It shows that, using the method of the present invention, the processing time is significantly reduced.

With the present invention, an efficient, fully automated, easy-to-use 3D computer processing method and system can be used in real-time and it also works on multiple platforms. As described in greater detail above, the advantageous techniques described herein are tolerant to compass errors of 3D scanning devices causing misalignment of 3D models. Further, the entire process is fully automated, alleviating the need for manual post-processing to form complete, accurate, fully-formed 3D models suitable for many commercial and consumer applications. The methods and systems described herein are designed to run efficiently on even low cost, low power, System on Chip (SoC)-based processor platforms—such as ARM processors that run Android™/Linux™ operating systems.

Figure 13:
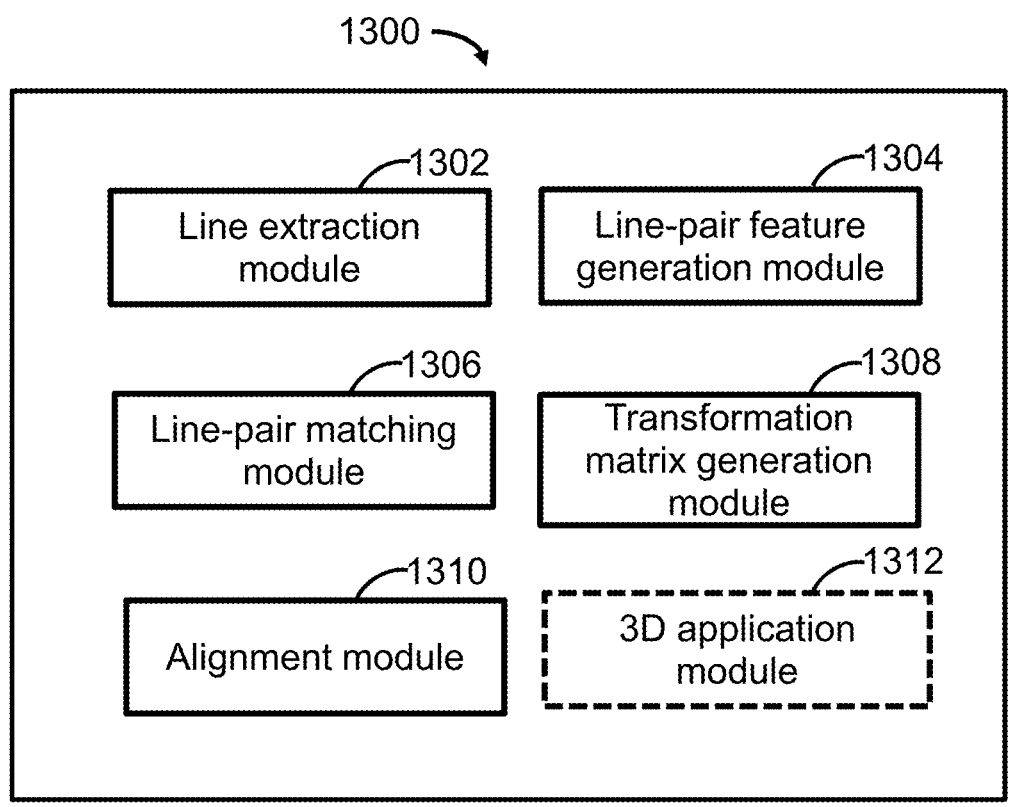
FIG. 13 is a schematic software diagram of a computerized apparatus for global registration between two point clouds according to embodiments of the present invention.

FIG. 13 is a schematic diagram of a computerized apparatus 1300 for global registration between a first point cloud and a second point cloud obtained by a scanning device on an identical spatial scene at two separate instances according to embodiments of the present invention. The computerized apparatus 1300 is operable to perform the methods/processes described with reference to FIGS. 2-12.

To this end, the computerized apparatus 1300 comprises a line extraction module 1302 configured to extract a first set of discriminative line-pairs from the first point cloud (i.e., the reference model) and a second set of discriminative line-pairs from the second point cloud (i.e., the scene model). Further, the computerized apparatus 1300 comprises a line-pair feature generation module 1304 configured to generate line-pair features for each extracted line-pair. Those line-pair features are used for finding similar line-pairs between the two point clouds.

The computerized apparatus 1300 further comprises a line-pair matching module 1306 where a plurality of matching line-pair groups is identified between the line-pairs in the reference model and that in the scene model. In some embodiments, the line-pair matching module 1306 is configured to apply a thresholding criterion related to between-line relationship, line geometry and line location and a compass angle criterion on the line-pairs to find matching line-pairs between the two models.

The computerized apparatus 1300 further comprises a transformation matrix generation module 1308 and an alignment module 1310. The transformation matrix generation module 1308 is configured to compute a global transformation matrix as described above, and the alignment module 1310 is configured to use the global transformation matrix to align the first point cloud and the second point cloud and obtain aligned models.

In some embodiments, the computerized apparatus 1300 may further comprise a 3D application module 1312 configured to perform 3D modelling applications based on the aligned models.

The apparatus or system and method of the present invention may be implemented in the form of a software application running on a computerized system. Further, portions of the methods may be executed on one such computerized system, while the other portions are executed on one or more other such computerized systems. Examples of the computerized system include a mainframe, personal computer, handheld computer, server, etc. The software application may be stored on a recording media locally accessible by the computer system and accessible via a hard wired or wireless connection to a network, for example, a local area network, or the Internet.

The computerized system may include, for example, a processor, random access memory (RAM), a printer interface, a display unit, a local area network (LAN) data transmission controller, a LAN interface, a network controller, an internal bus, and one or more input devices, for example, a keyboard, mouse etc. The computerized system can be connected to a data storage device.

Figure 14:
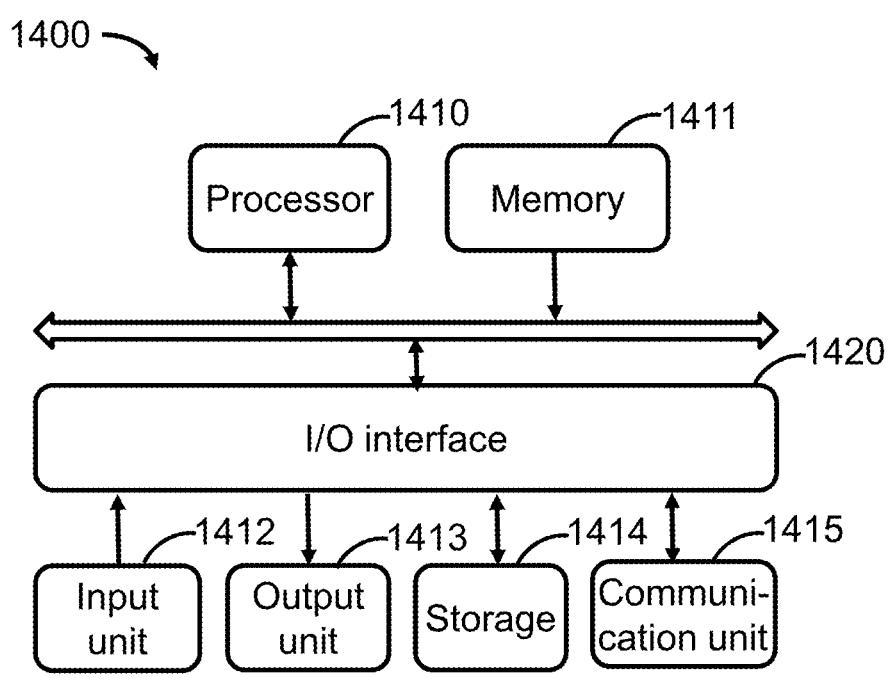
FIG. 14 is a schematic diagram of a computerized system for global registration between two point clouds according to an embodiment of the present invention.

The apparatus or system and method of the present disclosure may be implemented in the form of a software application running on a computerized system. FIG. 14 is a schematic diagram of a computerized system 1400 for global registration between a first point cloud and a second point cloud obtained by a scanning device on an identical spatial scene at two separate instances according to an embodiment of the present invention, consisting of both the hardware and software components that can be used to implement the embodiments of the present invention.

The hardware components in the present embodiment further comprises the processor 1410, memory 1411 and multiple interfaces. A plurality of components in the computerized system 1400 connected to an I/O interface 1420 comprises an input unit 1412, an output unit 1413, a storage 1414 and a communication unit 1415 such as a network card, modem, radio communication transceiver etc. In another embodiment, the present disclosure may also be deployed in a distributed computing environment that includes more than one computerized system 1400 connected together through one or more networks. The networks can include one or more of the internet, an intranet, an extranet, a cellular network, a local area network (LAN), a home area network (HAN), metropolitan area network (MAN), a wide area network (WAN), a Bluetooth network, public and private networks, etc.

The processor 1410 can be a central processing unit (CPU), microprocessor, microcontrollers, digital signal processor (DSP), field programmable gate arrays (FPGA), application-specific integrated circuits (ASIC), etc., for controlling the overall operation of memory (such as random access memory (RAM) for temporary data storage, read only memory (ROM) for permanent data storage, and firmware). One or more processors can communicate with each other and memory and perform operations and tasks that implement one or more blocks of the flow diagrams discussed herein.

The memory 1411, for example, stores applications, data, programs, algorithms (including software to implement or assist in implementing example embodiments) and other data. Memory 1411 can include dynamic or static random-access memory (DRAM or SRAM) or read-only memory such as Erasable and Programmable Read-Only Memories (EPROMs), Electrically Erasable and Programmable Read-Only Memories (EEPROMs) and flash memories, as well as other memory technologies, singly or jointly combined. In some embodiments, the processor 1410 can be configured to execute the above described various procedures and processing, such as methods/processes described with reference to FIGS. 2-12.

The storage 1414 typically includes persistence storage such as magnetic disks such as fixed and removable disks; other magnetic media including tape; optical media such as Compact Disks (CDs) or Digital Versatile Disks (DVDs), and semiconductor storage devices such as flash memory cards, solid-state drive, EPROMs, EEPROMS or other storage technologies, singly or in combination. Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

The input unit 1412 is the interfacing components that connect the computerized system 1400 to data input devices such as keyboard, keypad, pen-based device, mouse or other point devices, voice-input apparatus, scanner or other input technologies. According to an embodiment of the present invention, the input unit 1412 may include at least one 3D sensor which captures a 3D scene for providing 3D data of the 3D scene to the computerized system 1400. The output unit 1413 is the interfacing components for the computerized system 1400 to send data to the output devices such as a CRT or flat panel display monitor, printer, voice output apparatus, loud speaker or other output technologies. The communication unit 1415 may typically include the serial or parallel interface and the USB (Universal Serial Bus) interfaces, and other interfacing technologies. The communication unit 1415 may also enable the computerized system 1400 to exchange information with external data-processing devices via a data communication network such as the Personal Area Network (PAN), the Local Area Network (LAN), the Wide Area Network (WAN), the Internet, and other data communication network architectures. The communication unit 1415 can include the Ethernet interface, the Wireless LAN interface device, the Bluetooth interfacing device and other networking devices, singly or in combination.

Software further includes the operating system, and the application software systems as shown in FIG. 14. Operating system is to manage all the hardware resources, and schedule executing priorities for all tasks and processes so that the four application software systems can all be executed in an orderly manner.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the application software systems may be executed in a distributed computing environment. The software program and its related databases can be stored in a separate file server or database server and is transferred to the local host for execution. The computerized system 1400 as shown in FIG. 14 is therefore an exemplary embodiment of how the present invention can be implemented. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A computer-implemented method for global registration between a first point cloud and a second point cloud on an identical spatial scene at two separate instances, comprising:
    obtaining, by a scanning device, the first point cloud and the second point cloy d on the identical spatial scene at the two separate instances;
    extracting, by a processor, a first set of discriminative line-pairs from the first point cloud and a second set of discriminative line-pairs from the second point cloud wherein the discriminative line-pair has high discriminative power compared to a randomly selected line-pair;
    identifying, by the processor, a plurality of matching line-pair groups, each of the matching line-pair groups comprising a first discriminative line-pair selected from the first set of discriminative line-pairs and a second discriminative line-pair selected from the second set of discriminative line-pairs, wherein the first discriminative line-pair and the second discriminative line-pair satisfy:
        at least one thresholding criterion related to between-line relationship, line geometry and line location; and
        a compass angle criterion when the first discriminative line-pair is transformed to a reference coordinate by a first transformation matrix and the second discriminative line-pair is transformed to the reference coordinate by a second transformation matrix;
    selecting, by the processor, a best orientation angle for the first point cloud and the second point cloud derived from compass angles for the plurality of matching line-pair groups;

computing, by the processor, a global transformation matrix based on the best orientation angle, aggregations of respective first transformation matrices and respective second transformation matrices; and using the global transformation matrix to align the first point cloud and the second point cloud.

2. The method of claim 1, wherein a first line and a second line of each of the discriminative line-pairs are in relationship of the following: the first line being a vertical line (V-line) and the second line being a horizontal line (H-line); or both the first line and the second line being two non-parallel horizontal lines (H-lines).

3. The method of claim 1, further comprising a step of generating a line-pair feature vector for each of the discriminative line-pairs, wherein the generating step comprises:

computing a minimum distance and an acute angle between a first line and a second line of said discriminative line-pair;

computing lengths of the first line and the second line; and determining locations of center points of the first line and the second line.

4. The method of claim 3, wherein identifying the plurality of matching line-pair groups comprises:

for each line-pair from the first set of discriminative line-pairs which refers to a first line-pair, comparing the line-pair feature vector of said first line-pair with respective line-pair feature vectors of line-pairs from the second set of discriminative line-pairs;

determining one or more line-pairs from the second set of discriminative line-pairs as a candidate of matching line-pairs to said first line-pair if the line-pair feature vector of said first line-pair and the one or more line-pairs meet the at least one thresholding criterion; and grouping said first line-pair and the candidate of matching line-pairs into a matching line-pair group, said first line-pair being the first discriminative line-pair and the candidate of matching line-pairs being the second discriminative line-pair.

5. The method of claim 3, wherein the at least one thresholding criterion that the first discriminative line-pair and the second discriminative line-pair from a matching line-pair group satisfy comprises:

each of the following is within a respective pre-determined threshold:

an absolute difference between the minimum distance of the first discriminative line-pair and that of the second discriminative line-pair;

an absolute difference between the length of the first line of the first discriminative line-pair and length of the first line of the second discriminative line-pair;

an absolute difference between the length of the second line of the first discriminative line-pair and length of the second line of the second discriminative line-pair;

an absolute difference between a vertical value of the center point of the first line of the first discriminative line-pair and a vertical value of the center point of the first line of the second discriminative line-pair;

an absolute difference between a vertical value of the center point of the second line of the first discriminative line-pair and a vertical value of the center point of the second line of the second discriminative line-pair; and an absolute difference between the acute angle of the first discriminative line-pair and the acute angle of the second discriminative line-pair.

6. The method of claim 4, wherein identifying the plurality of matching line-pair groups further comprises:

transforming the first discriminative line-pair to the reference coordinate by applying the first transformation matrix to each point on the first discriminative line-pair, such that the first line of the first discriminative line-pair is aligned with X-axis of the reference coordinate;

projecting the second line of the first discriminative line-pair onto Y-Z plane of the reference coordinate to obtain a first projected line;

obtaining a first acute angle between the first projected line and Y-axis of the reference coordinate;

transforming the second discriminative line-pair to the reference coordinate by applying the second transform matrix to each point on the second discriminative line-pair, such that the first line of the second discriminative line-pair is aligned with the X-axis of the reference coordinate;

projecting a second line of the second discriminative line-pair on the Y-Z plane to obtain a second projected line;

obtaining a second acute angle between the second projected line and Y-axis of the reference coordinate;

calculating an absolute difference between the first acute angle and the second acute angle as a compass angle difference; and determining that the first discriminative line-pair and the second discriminative line-pair form the matching line-pair group if the compass angle absolute difference is less than a threshold of a compass error of the scanning device.

7. The method of claim 1, further comprising:

for each of the plurality of matching line-pair groups, computing the first transformation matrix for the first discriminative line-pair, such that a first line of the first discriminative line-pair is aligned with X-axis of the reference coordinate; and computing the second transformation matrix for the second discriminative line-pair, such that a first line of the second discriminative line-pair is aligned with the X-axis of the reference coordinate.

8. The method of claim 6, wherein selecting the best orientation angle comprises: selecting one compass angle difference from the calculated compass angle differences as the best orientation angle between the first point cloud and the second point cloud by a voting scheme among all discriminative line-pairs of the plurality of matching line-pair groups.

9. The method of claim 8, wherein the voting scheme comprises:

establishing a voting table, wherein rows of the voting table indicate the first set of discriminative line-pairs and columns of the voting table indicate a finite number of angular bins corresponding to quantized compass angle differences, wherein all cells in the voting table are initialized to zero;

for each of the rows in the voting table, identifying a candidate set of second discriminative line-pairs from the plurality of matching line-pair groups wherein its first discriminative line-pair corresponds to the row and using the row as an index;

for each entry in the candidate set, retrieving the compass angle difference between the second discriminative line-pair corresponding to the entry and the first discriminative line-pair corresponding to the row;
if the retrieved compass angle difference falls into a particular angular bin of the row, incrementing the voting table cell corresponding to the particular angular bin of the row;
tallying up the counts for each of the columns; and
identifying a compass angle difference corresponding to a column having the maximum value as the best orientation angle.

10. The method of claim 9, wherein computing the global transformation matrix comprises:
building a candidate set of transformation matrices based on a first aggregation of respective first transformation matrices, a second aggregation of respective second transformation matrices and the best orientation angle, wherein the respective first transformation matrices are aggregated from those first transformation matrices having a non-zero value within the table column corresponding to the best orientation angle and the respective second transformation matrices are aggregated from those second transformation matrices from the same table column;
computing estimated pose for each line in the plurality of matching line-pair groups from the second set of discriminative line-pairs by using corresponding transformation matrices from the candidate set of transformation matrices;
forming line clusters from the second set of discriminative line-pairs by finding similar estimated pose; and
averaging transformation matrices of the line clusters to obtain the global transformation matrix.

11. A computerized system comprising:
a processor;
a memory coupled to the process; and
a 3D scanning device to capture an identical spatial scene at two separate instances for providing a first point cloud and a second point cloud to the computerized system,
wherein the memory and the processor together are configured to cause the computerized system to perform actions comprising:
extracting a first set of discriminative line-pairs from the first point cloud and a second set of discriminative line-pairs from the second point cloud wherein the discriminative line-pair has high discriminative power compared to a randomly selected line-pair;
identifying a plurality of matching line-pair groups, each of the matching line-pair groups comprising a first discriminative line-pair selected from the first set of discriminative line-pairs and a second discriminative line-pair selected from the second set of discriminative line-pairs, wherein the first discriminative line-pair and the second discriminative line-pair satisfy:
at least one thresholding criterion in terms of between-line relationship, line geometry and line location; and
a compass angle criterion when the first discriminative line-pair is transformed to a reference coordinate by a first transformation matrix and the second discriminative line-pair is transformed to the reference coordinate by a second transformation matrix;
selecting a best orientation angle for the first point cloud and the second point cloud derived from compass angles for the plurality of the matching line-pair groups;
computing a global transformation matrix based on the best orientation angle, aggregations of respective first transformation matrices and respective second transformation matrices; and
using the global transformation matrix to align the first point cloud and the second point cloud.

12. The system of claim 11, wherein a first line and a second line of each of the discriminative line-pairs are in relationship of the following: the first line being a vertical line (Wine) and the second line being a horizontal line (H-line); or both the first line and the second line being two non-parallel horizontal lines (H-lines).

13. The system of claim 11, wherein the memory and the processor together configured to cause the computerized system to perform a further action of generating a line-pair feature vector for each of the discriminative line-pairs, wherein the generating action comprises:
computing a minimum distance and an acute angle between a first line and a second line of said discriminative line-pair;
computing lengths of the first line and the second line; and
determining locations of center points of the first line and the second line.

14. The system of claim 13, wherein the action of identifying the plurality of matching line-pair groups comprises:
for each line-pair from the first set of discriminative line-pairs which refers to a first line-pair,
comparing the line-pair feature vector of said first line-pair with respective line-pair feature vectors of line-pairs from the second set of discriminative line-pairs;
determining one or more line-pairs from the second set of discriminative line-pairs as a candidate of matching line-pairs to said line-pair if the line-pair feature vector of said first line-pair and the one or more line-pairs meet the at least one thresholding criterion; and
grouping said first line-pair and the candidate of matching line-pairs into a matching line-pair group, said first line-pair being the first discriminative line-pair and the candidate of matching line-pairs being the second discriminative line-pair.

15. The system of claim 14, wherein the action of identifying the plurality of matching line-pair groups further comprises:
transforming the first discriminative line-pair to the reference coordinate by applying the first transformation matrix to each point on the first discriminative line-pair, such that the first line of the first discriminative line-pair is aligned with X-axis of the reference coordinate;
projecting the second line of the first discriminative line-pair onto Y-Z plane of the reference coordinate to Obtain a first projected line;
obtaining a first acute angle between the first projected line and Y-axis of the reference coordinate;
transforming the second discriminative line-pair to the reference coordinate by applying the second transform matrix to each point on the second discriminative line-pair, such that the first line of the second discriminative line-pair is aligned with the X-axis of the reference coordinate;
projecting a second line of the second discriminative line-pair on the Y-Z plane to obtain a second projected line;
obtaining a second acute angle between the second projected line and Y-axis of the reference coordinate;

calculating an absolute difference between the first acute angle and the second acute angle as a compass angle difference; and determining that the first discriminative line-pair and the second discriminative line-pair form the matching line-pair group if the compass angle absolute difference is less than a threshold of a compass error of the scanning device.

16. The system of claim 11, wherein the memory and the processor together configured to cause the computerized system to perform a further action comprising:

for each of the plurality of matching line-pair groups, computing the first transformation matrix for the first discriminative line-pair, such that a first line of the first discriminative line-pair is aligned with X-axis of the reference coordinate; and computing the second transformation matrix for the second discriminative line-pair, such that a first line of the second discriminative line-pair is aligned with the X-axis of the reference coordinate.

17. The system of claim 15, wherein the action of selecting the best orientation angle comprises:

selecting one compass angle difference from the calculated compass angle differences as the best orientation angle between the first point cloud and the second point cloud by a voting scheme among all discriminative line-pairs of the plurality of matching line-pair groups.

18. The system of claim 17, wherein the voting scheme comprises:

establishing a voting table, wherein rows of the voting table indicate the first set of discriminative line-pairs and columns of the voting table indicate a finite number of angular bins corresponding to quantized compass angle differences, wherein all cells in the voting table are initialized to zero;

for each of the rows in the voting table, identifying a candidate set of second discriminative line-pairs from the plurality of matching line-pair groups wherein its first discriminative line-pair corresponds to the row and using the row as an index;

for each entry in the candidate set, retrieving the compass angle difference between the second discriminative line-pair corresponding to the entry and the first discriminative line-pair corresponding to the row;

if the retrieved compass angle difference falls into a particular angular bin of the row, incrementing the voting table cell corresponding to the particular angular bin of the row;

tallying up the counts for each of the columns; and identifying a compass angle difference corresponding to a column having the maximum value as the best orientation angle.

19. The system of claim 18, wherein the action of computing the global transformation matrix comprises:

building a candidate set of transformation matrices based on a first aggregation of respective first transformation matrices, a second aggregation of respective second transformation matrices and the best orientation angle, wherein the respective first transformation matrices are aggregated from those first transformation matrices having a non-zero value within the table column corresponding to the best orientation angle and the respective second transformation matrices are aggregated from those second transformation matrices from the same table column;

computing estimated pose for each line in the plurality of matching line-pair groups from the second set of discriminative line-pairs by using corresponding transformation matrices from the candidate set of transformation matrices;

forming line clusters from the second set of discriminative line-pairs by finding similar estimated pose; and averaging transformation matrices of the line clusters to obtain the global transformation matrix.

\* \* \* \* \*